United States Patent
Kimball

[11] 3,992,810
[45] Nov. 23, 1976

[54] SEEDLING TRAY
[75] Inventor: Alvan C. Kimball, Wadsworth, Ohio
[73] Assignee: Lakeland Enterprises, Inc., Tampa, Fla.
[22] Filed: Mar. 21, 1975
[21] Appl. No.: 560,343

[52] U.S. Cl. .................. 47/77; 47/87; 47/84; 206/423; 229/2.5 R; 220/23.8
[51] Int. Cl.² .................. A01G 9/02; B65D 1/00
[58] Field of Search .......... 47/34, 38, 34.11, 34.13, 47/38.1, 37; 206/423; 220/23.4, 23.8; 229/2.5

[56] References Cited
UNITED STATES PATENTS

| | | | |
|---|---|---|---|
| 1,117,474 | 11/1914 | Lattuca | 47/38.1 |
| 2,859,557 | 11/1958 | Lattuca | 47/34 |
| 3,164,478 | 1/1965 | Bostrom | 229/2.5 |
| 3,400,873 | 9/1968 | Bessett | 229/2.5 |
| 3,447,261 | 6/1969 | Hundt | 47/34.13 |
| 3,513,594 | 5/1970 | Hasselbach | 47/34.13 X |
| 3,557,489 | 1/1971 | Ferrand | 47/34.13 X |
| 3,647,105 | 3/1972 | Keeslar | 220/23.4 |
| 3,678,620 | 7/1972 | Voges | 47/34.11 |
| 3,783,555 | 1/1974 | Peters | 47/38 |
| 3,788,002 | 1/1974 | Suchka | 47/34.13 |
| 3,807,622 | 4/1974 | Belcher | 229/2.5 |
| 3,834,609 | 9/1974 | Congleton | 229/2.5 |
| 3,868,054 | 2/1975 | Congleton | 206/423 |

Primary Examiner—Edgar S. Burr
Assistant Examiner—James R. Feyrer
Attorney, Agent, or Firm—Stefan M. Stein

[57] ABSTRACT

A multi-compartmented container formed from a single sheet of material having its various portions folded upon one another in predetermined arrangement along flexible hinge-type connections. One or more channels are defined within the container wherein each channel includes an elongated base movably attached to elongated side walls which together at least partially define a channel. Divider portions are attached to at least the side walls of the channel and disposed in divider portion sets mounted on the side walls to engage one another in a removable, locking tongue and groove connection wherein the sets are disposed in spaced relation along the length of the channel to at least partially define segmented and successively arranged compartments.

6 Claims, 7 Drawing Figures

U.S. Patent  Nov. 23, 1976  3,992,810
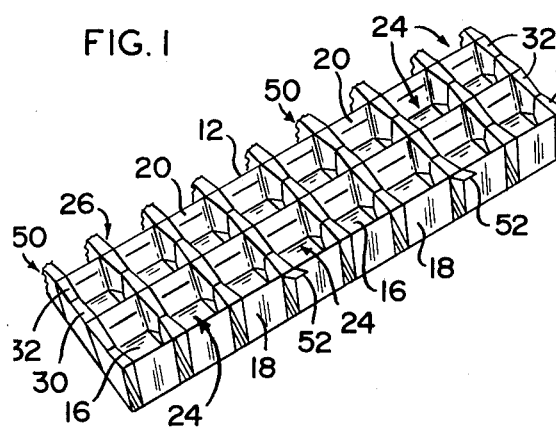
FIG. 1
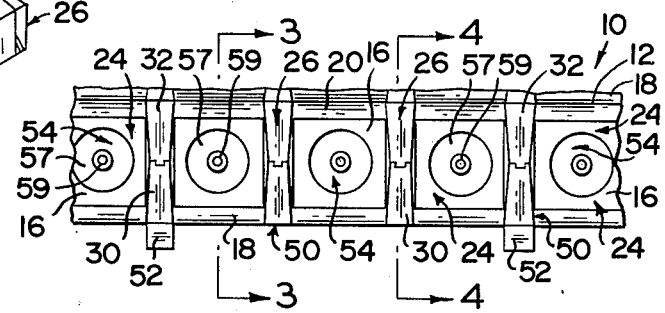
FIG. 2
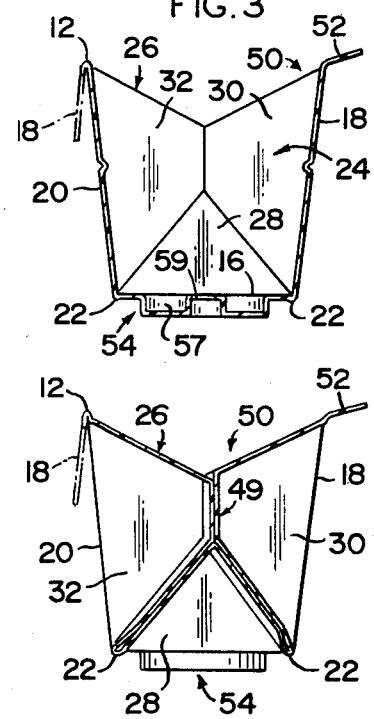
FIG. 3
FIG. 4
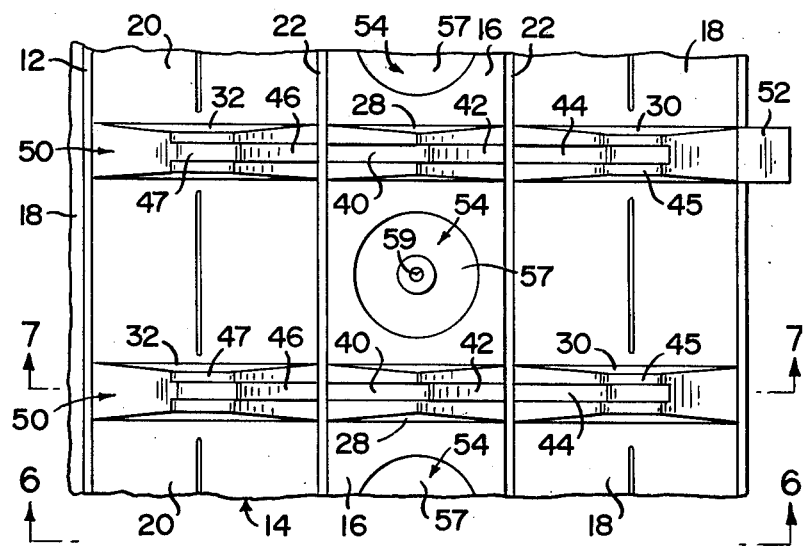
FIG. 5
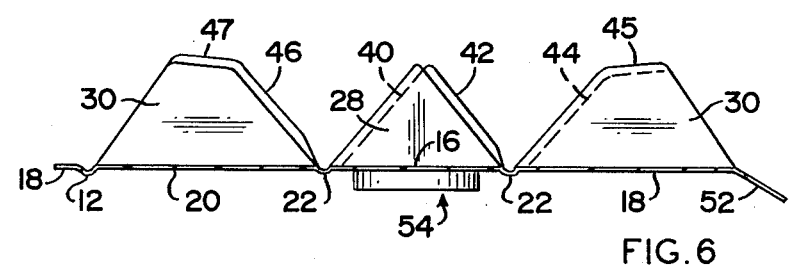
FIG. 6
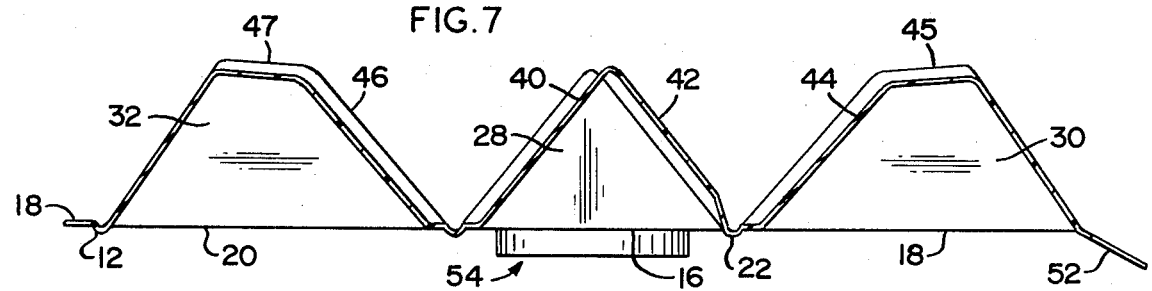
FIG. 7

SEEDLING TRAY

BACKGROUND OF THE INVENTION

1. Field of the Invention

A collapsible, multi-compartmented tray wherein each of the various compartments are at least partially defined by interlocking integrally formed divider portions mounted at correspondingly positioned locations so as to be disposed in engagement with one another along a predetermined length of the container. Force exerted on predetermined portions of the container causes it to unfold and collapse into a substantially single, planar sheet.

2. Description of the Prior Art

Multi-compartmented containers specifically designed for various particular applications are quite well-known in the packaging and related industries. Depending upon the particular product or goods intended to be utilized in combination with such a container, there is frequently a recognized difficulty in removing such goods from the various compartments comprising the container. Such difficulty includes not only the possibility of damaging various products upon removal, but also such problems relate to the efficiency, speed and effectiveness with which the products can be removed on an automated basis.

The problems mentioned above again are widely recognized from containers such as ice trays wherein the removal of the ice cubes formed in the various compartments has been a universally accepted difficulty frequently requiring unusual strength and force being exerted on the container.

From an industrial standpoint, the nursery industry is indicative of the commercial utilization of multi-compartmented containers which require effective and efficient means of removing seedlings and the like from the various compartments in a seedling tray.

In the nursery trade, it is common practice to plant seeds in shallow compartmentalized trays for germination and sprouting. These shallow trays are filled with potting soil which is kept in a moist condition until the sprouts from the seeds project through the surface of the soil. When the seed sprouts are of a desired height, or maturity, the seedlings or sprouts are then removed from the germination tray. Usually, the seedlings are removed from the soil manually by plucking or pulling the seedling with its roots from the soil by finger pressure. Manual removal of the seedlings from the soil often results in separation of the root structure from the seedling, and/or serious damage to the seedling which renders it incapable of further growth. Since removal of the entire root structure with the seedling is of paramount importance in transplanting a plant in its early stages of development, it has thus been desirable to find a seedling tray which will enable removal of the plants from the potting soil without damage to the roots.

Previous attempts to provide a seedling tray with a removable insert which would enable the seedling to be removed from the soil without damage, have utilized such expedients as a removable grid or single removable channels which could be opened by disengaging fasteners, such as locking tabs, to permit the insert to be opened for loosening the potting soil in each cavity about the roots of the seedling in that cavity. However, removal of the potting soil from a grid or individual channel is a time-consuming and laborious task which necessarily limits the rate at which seedlings may be removed from the potting soil. Thus, it has long been desirable to find an insert for a seedling germinating tray which permits simultaneous rapid and easy loosening of the soil about each of a plurality of seedlings and thus enable rapid removal of the seedlings from the soil without concurrent damage to the root structure of the seedlings.

Accordingly, it can be seen that there is a great need in many industries for a multi-compartmented container having a structure and design which allows the easy removal of the contents from the various compartments. The design of such a container should be such that it could be manufactured from a disposable material or, alternately, be manufactured from a substantially durable material capable of re-use and even sterilization techniques including chemical application and excessive heat treatment. Irrespective of the material used to construct such a container, an important feature thereof should be its ability to "collapse" or allow for the separation and access to the various compartments without the exertion of unnecessary time and/or force thereon.

SUMMARY OF THE INVENTION

The present invention relates to a multi-compartmented container designed to be readily collapsed into a unitary sheet of material wherein the various compartments are formed within one or more elongated channels due to a pre-arranging through folding of various portions of the base sheet comprising the container. Numerous figures describing the subject invention, to be set forth in greater detail hereinafter, relate to a structure which may be commonly referred to as a seedling tray used in the plant cultivating or nursery industry. It should be noted, however, that the structure of the present invention is intended to be directed primarily to a multi-compartmented container capable of a wide variety of uses and specifically not limited to application as a seedling tray or for utilization in the plant cultivation industry per se. Accordingly, the various materials which may be used to produce the structure of the subject invention may vary greatly from a substantially rigid, durable material capable of re-use and being subjected to various sterilization treatments, including exposure to chemicals and excessive heat treatments. On the other hand, the material utilized may be substantially non-rigid and, accordingly, may be disposable such as a flexible, semi-rigid resinuous material.

Therefore, the present invention is directed to a multi-compartmented container which is preferably formed from a unitary sheet of desired material having a sufficient number of compartments formed therein when the portions of the sheet are disposed in a prearranged, folded position relative to one another. More specifically, the container of the present invention comprises one or more elongated open or substantially U-shaped channels. When a plurality of the channels are utilized, these channels are arranged in longitudinally extending side-by-side relation to one another wherein each channel has a base means and integral foldable side portions provided along the opposite longitudinal edges of the base means wherein the base means and the side portions at least partially define the parameters of the channel.

Divider means comprising a plurality of divider portions integrally formed on designated and correspondingly positioned areas of the side walls and the base means are arranged in sets wherein each divider portion of each set is positioned into substantially locking engagement with one another. Locking engagement occurs by means of a tongue and groove connection. This tongue and groove connection occurs by virtue of the specific configuration of the mutually engaging parts of each divider portion. Each set comprising the plurality of divider portions is arranged in spaced relation to a plurality of other sets so that the area in between the sets defines segmented, successively arranged compartments substantially along the length of the channel.

By virtue of the interlocking, engaging relation of the various divider portions comprising each set, the material arranged in each of the compartments is prevented from passing through the divider portions and thereby "contaminating" any other material in an adjacently located compartment.

When the subject structure is utilized for a seedling tray, the roots of the cultivated seedling are thereby prevented from passing through crevices or the like by virtue of the tongue and groove configuration and are limited to growth within the individual compartments separated by the interlocked, engaging divider portions comprising each set. When a plurality of channels are formed in the single sheet of material forming the multi-compartmented container, the upper or free marginal longitudinal edges of the side wall portions adjacently positioned to at least partially define adjacently positioned channels are interconnected by a flexible strip of material continuously extending along both of the free edges of the adjacently positioned and now interconnected side portions of the adjacently positioned channels. The flexibility of the interconnecting marginal portion allows unfolding and "collapse" of the container upon proper separating force being exerted to pull tabs to be described in greater detail hereinafter.

Pull tabs are provided on the free edges of the outer channel sides to enable the entire insert to be lifted from the sealing tray and extended to the unfolded condition by applying a tension force on the pull tabs. Thus, the present invention provides a multi-compartmented container formed of a unitary sheet of material which may take various forms. The sheet is folded in accordion-like manner to provide orientation of the various portions including the base means and side wall portions of each channel arranged in predetermined relation to one another so as to define a "locked" multi-compartmented container.

Another structural feature of the subject invention includes collection means formed in the base means of each compartment wherein the collection means comprises a plurality of recessed elements integrally formed in the base means as indicated and configured to be depressed out of the plane of the base means. By virtue of this arrangement, moisture within the compartment or within any product in the compartment will have a tendency to collect within this recessed element. Again, when the container is used for a seedling tray, the collection of moisture in the recessed element plus the specific depressed configuration will allow the roots to be collected in the recessed element and essentially wind about the drainage hole which is concentrically located in the approximate center of the recessed element of each compartment.

The invention accordingly comprises an article of manufacture processing the features, properties, and the relation of elements which will be exemplified in the article hereinafter described, and the scope of the invention will be indicated in the claims.

BRIEF DESCRIPTION OF THE DRAWINGS

For a further understanding of the nature and objects of the invention, reference should be had to the following detailed description taken in connection with the accompanying drawings in which:

FIG. 1 is a perspective view of a container comprising a plurality of integrally formed channels, each of which comprises a plurality of successively arranged compartments.

FIG. 2 is a top view of at least one channel as shown generally in FIG. 1.

FIG. 3 is a sectional view of the interior of one compartment taken along line 3—3 of FIG. 2.

FIG. 4 is a sectional view taken along line 4—4 of FIG. 2 showing the locking means comprising the various divider portions engaged in interlocking relation to one another.

FIG. 5 is a top plan, partial cutaway view of the integral sheet having the various components thereof which form the individual channels arranged in unlocked, unfolded orientation to one another.

FIG. 6 is an end view taken along line 6—6 of FIG. 5.

FIG. 7 is a sectional view taken along line 7—7 showing the details of the divider portions.

Similar reference characters refer to similar parts throughout the several views of the drawings.

DETAILED DESCRIPTION

As shown in the accompanying Figs., the present invention is directed to a multi-compartmented container generally indicated as 10 in FIGS. 1 and 2. While represented to have a single channel, the multi-compartmented container comprises one or more channels arranged in successive side-by-side relation to one another wherein each of the channels are formed from a unitary sheet of applicable material. When the container comprises a plurality of integrally formed channels, each of the channels is formed from the same unitary sheets and the various formed channels are interconnected to one another along a fold line 12. The unitary sheet is generally represented as 14 (FIG. 5) wherein the sheet is in its open or non-channel defining position (FIGS. 5-7).

Each of the channels are defined into a substantially U-shaped cross sectional configuration (FIGS. 3 and 4) comprising a base means 16 and sidewall portions 18 and 20. Accordingly, in any given channel its parameters and its U-shaped configuration are defined by side wall portions 18 and 20 extending along the longitudinal, oppositely disposed edges of base means 16. Each of the side wall portions 18 and 20 are integrally attached to the base means 16 and foldable relative thereto and movable relative to one another along the hinge means or hinge lines 22 extending along the length of the base means 16 and the respective side wall portions 18 and 20.

Each of the individual compartments, herein designated as 24, are arranged in successive relation to one another along each of the various channels which comprise the container. As will be explained in greater detail hereinafter, each of these compartments 24 are segregated from the next adjoining compartments by virtue of divider means generally indicated as 26 comprising a plurality of divider portions 28, 30 and 32 integrally connected to the base means 16, side wall portion 18 and side wall portion 20 respectively. As shown in FIGS. 5, 6 and 7, the various divider portions 28, 30 and 32 are arranged in aligned relation to one another, transversely to the longitudinal axis of the base means 16 and the side wall means 18 and 20 respectively. As shown in FIGS. 1, 3 and 4, the various compartments 24 are formed when the base means 16 and the respective side wall means are arranged in closed, locking relation to one another. The locking relation of the various portions of the channel into its closed position as represented in FIGS. 1, 3 and 4 is accomplished by what may be referred to as a locking means in the form of correspondingly positioned tongue and groove elements formed in the peripheral edges of the various divider portions 28, 30 and 32. More specifically, with reference to FIGS. 5 and 7, divider portion 28 comprises groove means 40 on one peripheral edge thereof and tongue means 42 on the oppositely disposed, angularly oriented peripheral edge portion. Similarly, divider portion 30 comprises a groove portion 44 disposed and aligned to frictionally engage in a locking relation with the tongue 42 on divider portion 28. Also, divider portion 32 comprises a tongue member 46 disposed and configured to frictionally engage in locking relation the groove portion 40 on divider portion 28. The upper peripheral edges of the side wall portions 30 and 32 include the extensions of their groove and tongue members respectively. For purposes of clarity, these extensions are designated as groove portion 45 and tongue portion 47. These groove and tongue expansions are correspondingly positioned and configured so as to lockingly engage one another, generally above the divider portion 28. Referring to FIG. 4, this latter connection is generally indicated as 49. Each of the divider sets 50 comprising the three designated divider portions arranged in unfolded or alternately interlocked relation to one another comprise the interlocking means so as to prevent spreading of the contents of one compartment to the next adjoining compartment. The frictional engagement provided by these tongue and groove locking means may be specifically configured and dimensioned to prevent any transfer of fluid, roots, soil or the like between the various adjacently located compartments 24. When each of these successively arranged channels are all arranged in closed, folded relation, a pull tab means 52 which is integrally formed on the outermost top longitudinal edge of a side wall 18, may be utilized to apply force to the outermost side wall protion 18 and thereby start the unfolding of each of the channels through the disengagement of the various divider portions which were formally arranged in interlocking relation to one another.

Another structural feature of the subject invention includes collection means generally indicated as 54, formed in the base means of each compartment. Each collection means comprises a plurality of circular or annular depressions which are configured to extend outwardly from the plane of the base means 16 as clearly shown in FIG. 3. Accordingly, the collection means comprises a compartment area 57 in which roots or like may be gathered due to the natural collection of moisture in this area. A drainage hole 59 is provided in the substantial center of each of the collection means 54 and/or of compartment 57 wherein the compartment 57 is located in substantially concentric relation to the centrally located drainage hole. As the name indicates, the drainage hole is provided to allow excess moisture and/or other fluid to exit the various compartments.

It will thus be seen that the objects set forth above, among those made apparent from the preceding description are efficiently attained, and since certain changes may be made in carrying out the above method and article without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. A multi-compartmented container for the growth of seedlings comprising at least one channel comprising base means extending along the length thereof, side wall means comprising a side wall portion movably connected to each oppositely disposed longitudinal edge of said base means, each of said side wall portions positionable in a substantially upstanding position relative to said base means and to one another, so as to at least partially define said channel means, divider means comprising a plurality of divider portions formed on said side wall means, said plurality of divider portions disposed in engageable divider portion sets, each divider portion set comprising at least two divider portions, each mounted in corresponding relation to one another on oppositely disposed side wall portions, said divider portion sets disposed in spaced relation to one another along the longitudinal dimension of said base means and said side wall means whereby substantially adjacent and segmented compartments are defined between said successively disposed sets of divider portions, means to prevent the roots of the seedlings from passing between adjacent compartments, said means comprising a tongue and groove connection along all the mutually engaging divider portions of each set, said connection being dimensioned and configured to define a locking engagement with one another, whereby said roots of the seedlings cannot pass between the adjacent compartments, the base means of each of said compartments including collection means, said collection means comprising a recessed compartment area and a drainage hole located on a raised portion of said recessed compartment area.

2. A multi-compartmented container as in claim 1 wherein each of said divider portion sets comprise correspondingly positioned divider portions mounted on said base means and each of said side wall portions, each of said divider portions mounted on and extending outwardly from said base means and each of said side wall portions, respectively, into mutually engageable relation with one another.

3. A multi-compartmented container as in claim 1 comprising a plurality of channels, each channel having a substantially elongated configuration and disposed in substantially parallel, interconnected relation to one another, flexible interconnecting marginal portions integrally attached along the free edge of adjacently positioned side wall portions of adjacently positioned channels.

4. A multi-compartmented container as in claim 3 further comprising hinge means defined by a flexibly elongated junction disposed in interconnecting relation between said base means of each channel and said side wall portions connected to each of said base portions; whereby said container is collapsible into a substantially single sheet upon separation of said engaged sets of divider portions and relative movement of said side wall means of said channels along said marginal portions and said hinge means.

5. A multi-compartmented container as in claim 1 wherein each of said plurality of recessed elements is integrally formed in said base means and depressed from the plane of said base means, whereby liquid material within said compartment is collected within said recessed element.

6. A multi-compartmented container as in claim 1 wherein said recessed element is disposed in concentric relation to said drain means.

* * * * *